(12) United States Patent
Mateer

(10) Patent No.: US 8,665,758 B1
(45) Date of Patent: Mar. 4, 2014

(54) METHOD, SYSTEM, AND COMPUTER READABLE MEDIUM FOR TRANSLATING AND REDIRECTING CALLS

(75) Inventor: Michael Todd Mateer, Omaha, NE (US)

(73) Assignee: West Corporation, Omaha, NE (US)

( * ) Notice: Subject to any disclaimer, the term of this patent is extended or adjusted under 35 U.S.C. 154(b) by 1832 days.

(21) Appl. No.: 11/297,807

(22) Filed: Dec. 7, 2005

(51) Int. Cl.
*H04L 12/16* (2006.01)

(52) U.S. Cl.
USPC .......................................................... 370/260

(58) Field of Classification Search
USPC ............ 379/202.1, 229, 88.17; 370/260, 352, 370/261
See application file for complete search history.

(56) References Cited

U.S. PATENT DOCUMENTS

| | | | |
|---|---|---|---|
| 5,963,862 A | 10/1999 | Adiwoso | |
| 6,330,320 B1 * | 12/2001 | Cornell et al. | ............ 379/202.01 |
| 6,442,169 B1 | 8/2002 | Lewis | |
| 6,760,324 B1 * | 7/2004 | Scott et al. | ...................... 370/352 |
| 7,149,287 B1 * | 12/2006 | Burger et al. | .............. 379/88.17 |
| 7,227,938 B2 * | 6/2007 | Rodman et al. | ........... 379/202.01 |
| 7,460,493 B1 * | 12/2008 | Dhanoa et al. | ................. 370/260 |
| 2001/0005372 A1 * | 6/2001 | Cave et al. | ..................... 370/401 |
| 2001/0040957 A1 | 11/2001 | McCann | |
| 2003/0198216 A1 | 10/2003 | Lewis | |
| 2004/0062210 A1 * | 4/2004 | Genter et al. | .................. 370/260 |
| 2005/0152528 A1 * | 7/2005 | Newman et al. | ............... 379/229 |
| 2006/0215634 A1 * | 9/2006 | Croak et al. | ................... 370/352 |
| 2006/0268754 A1 * | 11/2006 | Ibezim et al. | ................. 370/261 |

* cited by examiner

*Primary Examiner* — Duc Nguyen
*Assistant Examiner* — Sonia Gay

(57) ABSTRACT

A system, method, and instruction set for translational routing and redirecting of media calls for use in teleconferencing applications. In operation, when a user places a conference call, it is routed through a carrier switch 14 to a media gateway 16 where routing translation on the call occurs and then a VoIP call is sent to an element management system 18 by way of an internet protocol network 22. The EMS 18 then accesses a central database 20 with an account number and retrieves a dialed number identification service 21 needed to redirect the call. The EMS then sends a REFER command indicating the new DNIS information to the MGW 16 by way the IP network 22. Finally, the MGW 16 performs the appropriate routing translation on the new DNIS and redirects the call through a time division multiplexing network 24 to the appropriate conferencing bridge 26,28.

11 Claims, 3 Drawing Sheets

METHOD, SYSTEM, AND COMPUTER READABLE MEDIUM FOR TRANSLATING AND REDIRECTING CALLS

BACKGROUND OF THE INVENTION

The present invention relates to the general field of communications systems and in particular, to a method, system, and computer readable medium for translating and redirecting calls.

There is a continuously growing demand in business, education, medical, and many other areas for remote conferencing capability. Such conferences allow individuals or groups of people anywhere in the world to have access to the latest information and the most notable experts from the presence of their home, business, or community. However, such capabilities demand that systems provide extremely high quality, security, bandwidth, and fail-proof operation. Users join these conferences with standard telephones, wireless telephones, dial-up and cable computer networks, DSL, and various other communication devices with the expectation of quick, secure access and clear, understandable interactive involvement as a participant in the conference.

One area of critical importance regarding these conferencing systems is a need for fast and secure access to the conference. This requires quick access to large volumes of secure data, including account numbers, dialed number identification services, and system configuration data. Therefore, there is a need for innovative systems and methods that can excel in these areas in order to provide efficient and effective experiences for individuals who use these systems.

Furthermore, existing systems in the art also lack the ability to dynamically route callers to an IP based EMS (alias Voice Gateway, IVR, VRU) to prompt and collect user account information and determine which conference bridge platform the call needs to be delivered too. Existing platforms also lack the ability redirect the call via SIP/RTP REFER Method back to the Media gateway for re-termination to the target conference bridge via traditional TDM signaling.

Accordingly, there is a need for a communications system for translating and redirecting calls, which overcomes the aforementioned prior art limitations.

SUMMARY OF THE INVENTION

The present invention provides a system, method, and computer readable medium for translational routing and redirecting of information such as media calls, such as may be typically used in teleconferencing applications. The system is comprised of a carrier switch for receiving calls from a user, which is coupled to a media gateway (MGW) for managing Voice over Internet Protocol (VoIP) switching of various media accessible information, an element management system (EMS) having access to a central database also coupled by means of an Internet Protocol (IP) network to the MGW, and finally one or more conferencing bridges coupled through a network, such as a time division multiplexing (TDM) network to the MGW.

In operation, when a user places a conference call, it is routed through the carrier switch to the MGW where routing translation on the call occurs and then a VoIP call is sent to the EMS by way of an IP network. Next, the EMS prompts the user for an account number and receives the number back through the MGW. The EMS then accesses a central database and retrieves an appropriate dialed number identification service (DNIS) needed to redirect the call. The EMS then sends a REFER command with the new DNIS information to the MGW by way of the IP network. Finally, the MGW performs the appropriate routing translation on the new DNIS and redirects the call through a time division multiplexing (TDM) network to the appropriate conferencing bridge.

BRIEF DESCRIPTION OF THE DRAWINGS

The above listed and further advantages of the invention may be better understood by referring to the following description in conjunction with the accompanying drawings, in which.

DETAILED DESCRIPTION OF THE INVENTION

Figure 1:
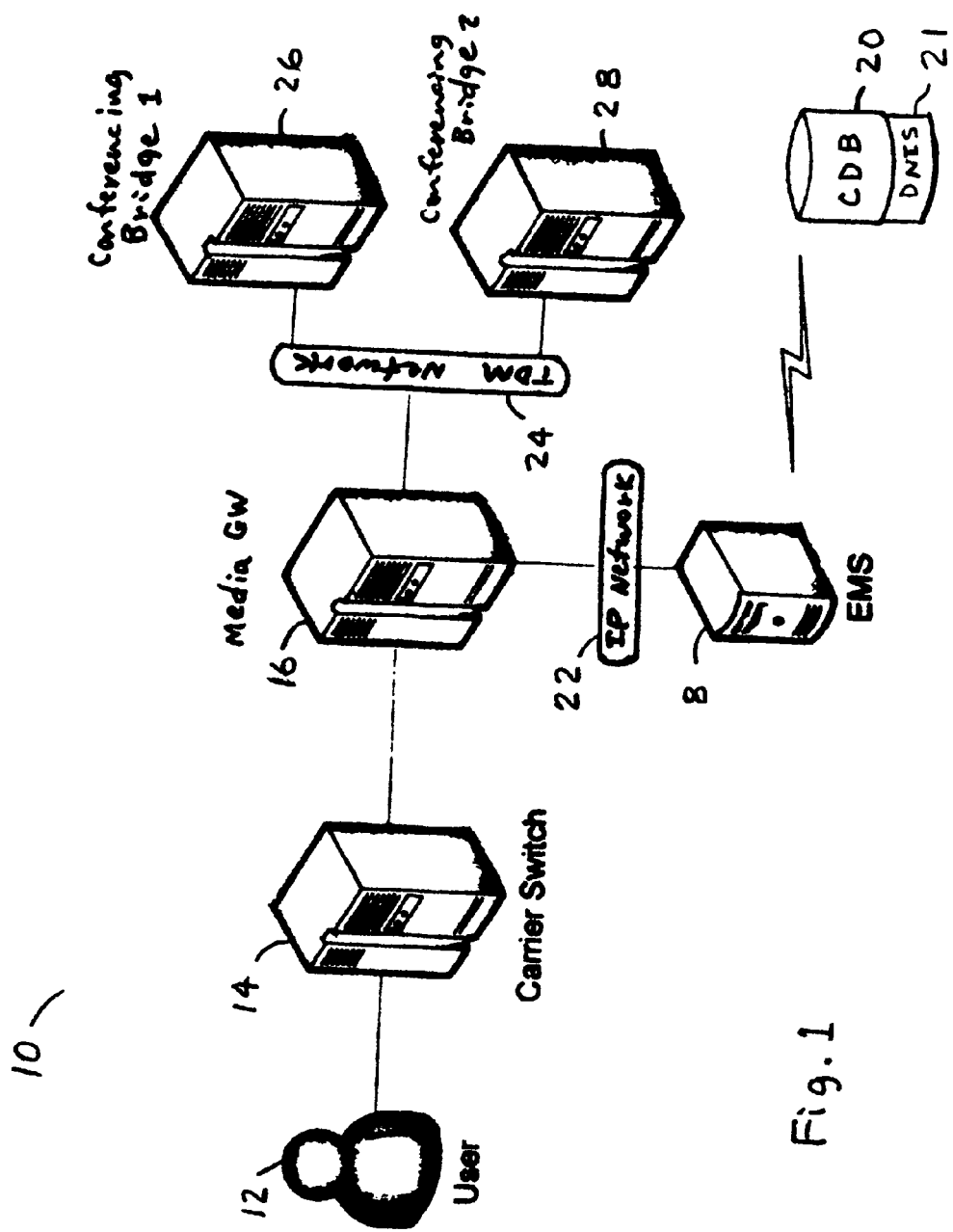
FIG. 1 is a block diagram showing the architecture of the preferred embodiment of the call routing and redirecting system of the present invention.

In the description that follows, like elements are marked throughout the specification and drawings with the same reference numerals, respectively. The drawing figures are not necessarily to scale and certain elements may be shown in generalized or schematic form in the interest of clarity and conciseness. The flow of information throughout the system of the present invention is shown in the figures and will be discussed in the following detailed discussion.

The system 10 of the preferred embodiment of the present invention for routing and redirecting calls, shown in FIG. 1, is comprised of a carrier switch CSW 14 for receiving calls from a user 12, a media gateway 16 having a first input/output (I/O) coupled to an output of the carrier switch 14, an element management system 18 coupled by means of an internet protocol network 22 to a second I/O of the media gateway 16, a central database 20 being accessible by the element management system, and one or more conferencing bridges 26,28 coupled through a time division multiplexing network 24 to a third I/O of the media gateway 16.

The typical carrier switch CSW 14 of the present invention is comprised of a computer system capable of switching telephones calls. Such switches typically provide customer services such as 800 numbers and credit card billings, but not local services. However, local telephone companies may use similar switches to handle call forwarding and call waiting services.

The media gateway (MGW) 16 of the present invention incorporates voice over internet protocol (VoIP) switching in the management and switching of various media accessible information. This media gateway is capable of supporting land-line and wireless telephone, cable, digital subscriber line (DSL), and other communication networks.

The element management system (EMS) 18 manages the functions and capabilities within one or more telecommunication networks. In the present invention there is an interne protocol (IP) network 22 coupling the element management system 18 with the MGW 16. Furthermore, the element management system has access to a central database 20 memory where user and system information is stored. The EMS 18 accesses the central database 20 with an account number and retrieves a dialed number identification service (DNIS) 21. The DNIS 21 typically identifies the number, especially when 800 or 900 numbers are used, that a caller dialed by passing the touch-tone digits to the destination where they are read.

One or more conferencing bridges 26,28 are connected to the output of the MGW 16 by means of a time division multiplexing (TDM) network 24. These conferencing bridges 26,28 connects multiple callers to a conference and monitors the conference call session. It continuously balances the lines so that each caller can clearly hear and speak regardless of the number of people entering or leaving the conference call.

Figure 2:
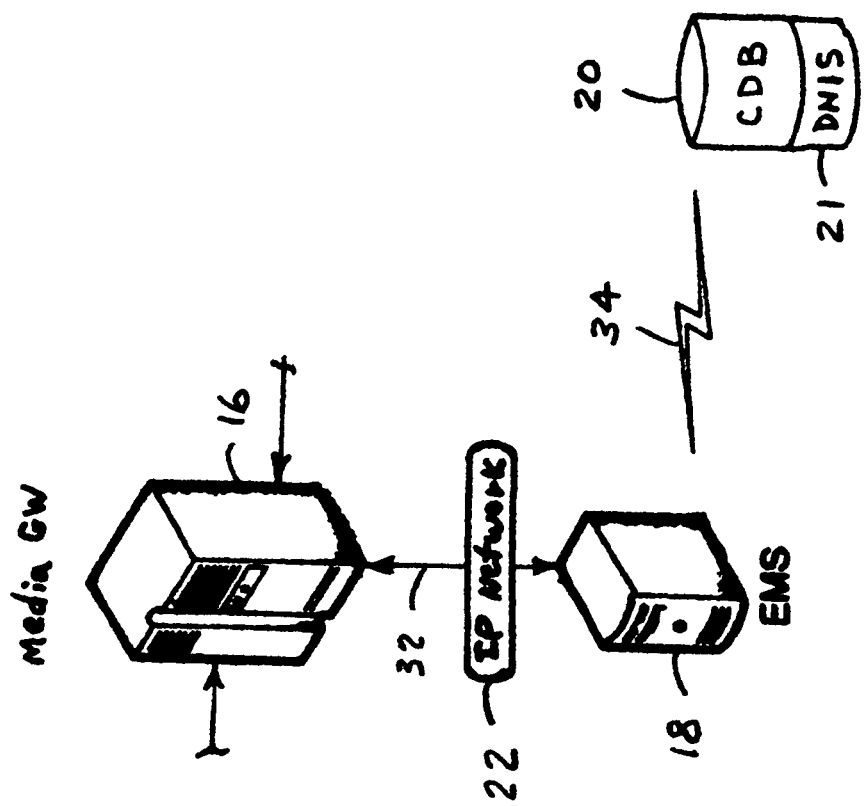
FIG. 2 is a block diagram illustrating the operation of the media gateway and element management system of the call routing and redirecting system.

FIG. 2 is a block diagram illustrating the operation of the media gateway and element management functions, which represent the core portion of the call routing and redirecting system. A call is received at the MGW 16 from a carrier where translation routing is performed on the call and a VoIP call is sent through the IP network 22 along path 32 to the EMS 18. The EMS then accesses 34 a central database 20 with an account number and retrieves an appropriate DNIS needed to redirect the call. The EMS 18 then sends the new DNIS in a REFER command back to the MG 16 via IP network 32 along path 22. The REFER command provides the new dialed number identification service to said media gateway, indicating the new address where the call needs to be directed. Then the MGW 16 routes the call to the appropriate destination.

Figure 3:
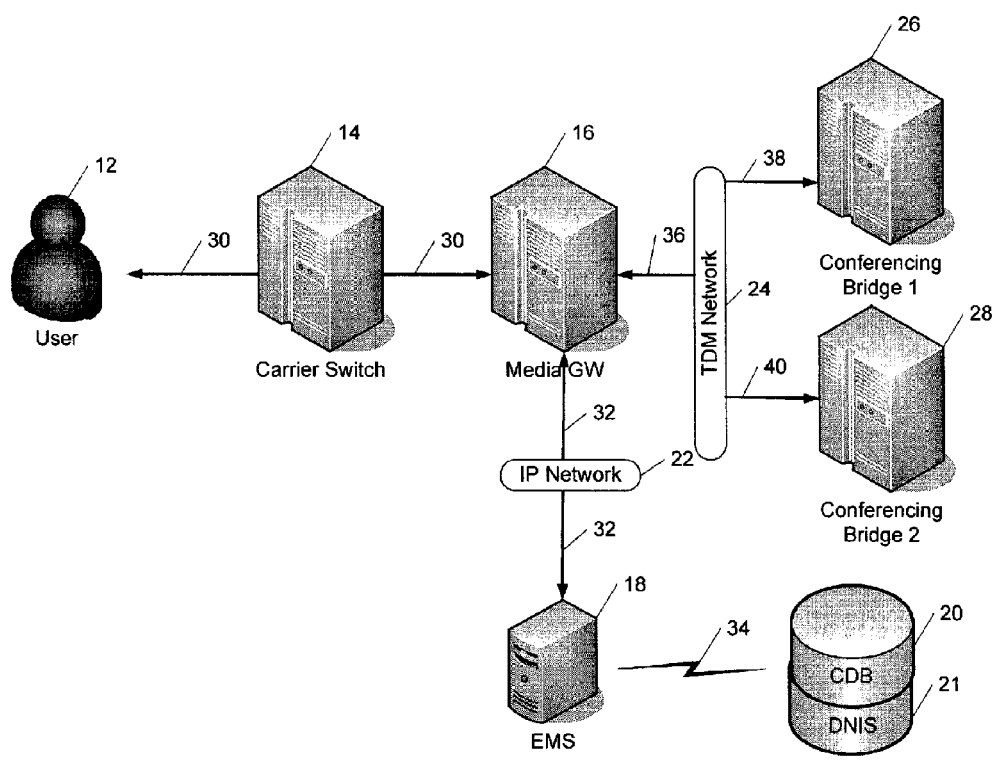
FIG. 3 is an architectural diagram illustrating the operation and information flow through the call routing and redirecting system.

FIG. 3 is an architectural diagram illustrating the operation and information flow through the call routing and redirecting system. In operation, when a user places a conference call, it passes along path 30 through a carrier switch 14 to a media gateway 16. The MGW 16 performs routing translation on the call and sends a voice over internet protocol call to the element management system 18 via path 32. The EMS 18 then prompts the user for an account number and receives the number back through the MGW 16. Next, the EMS 18 accesses 34 a central database 20 with the account number and retrieves the appropriate DNIS 21 needed to redirect the call. The EMS 18 then sends a REFER command indicating the new DNIS to the MGW 16 over path 32 by means of IP network 22. Finally, the MGW 16 performs routing translation on the new DNIS and redirects the call over path 36,38 or 36,40 through a TDM network 24 to the appropriate conferencing bridge 26,28.

Although preferred embodiments of a system for translating and redirecting calls has been described in detail herein, it will be appreciated that the present invention may provide applicable inventive concepts that can be embodied in a wide variety of specific contexts. For example, while the preferred embodiment of the invention has principally referenced a system, method, and instruction set for translational routing and redirecting of medial calls as might be used in teleconferencing applications it should be understood that the system may also be utilized for alternative applications. The specific embodiments discussed herein are merely illustrative of specific ways to make and use the invention, and do not delimit the scope of the invention. Those skilled in the art will recognize that various substitutions and modifications may be made to the invention without departing from the scope and spirit of the appended claims.

What is claimed is:

1. A method for routing a call to a conferencing bridge, comprising the steps of:
   receiving a call from a user at a media gateway;
   translating said call in said media gateway and sending a voice over internet protocol call through an internet protocol network to an element management system;
   accessing a central database by said element management system to retrieve a new dialed number identification service for redirecting said call;
   sending said new dialed number identification service by means of said internet protocol network to said media gateway;
   translating the route for said new dialed number identification service in said media gateway; and
   redirecting said call by means of a time division multiplexing network to an appropriate conferencing bridge.

2. The method of claim 1, wherein said element management system prompts and receives an account number from said user.

3. The method of claim 1, wherein said user initiates said call by a wired means, said wired means selected from the group consisting of: land-line telephones, Digital Subscriber Line, and cable.

4. The method of claim 1, wherein said user initiates said call by wireless means.

5. A system for routing messages, comprising:
   a media gateway;
   an element management system coupled through an internet protocol network to an interface connection of said media gateway; and
   one or more conferencing bridges coupled by means of a time division multiplexing network to the interface connection of said media gateway;
   wherein, a call is received from a user at the media gateway, translated in said media gateway and sent as a voice over internet protocol call through an internet protocol network to the element management system, which accesses a central database to retrieve a new dialed number identification service for redirecting said call, and wherein the new dialed number identification service is sent to said media gateway, a route is translated for said new dialed number identification service in said media gateway, and the call is redirected by means of a time division multiplexing network to the one or more conferencing bridges.

6. The system of claim 5 further comprising a central database being coupled to said element management system for storing retrieval data for use by said element management system.

7. The system of claim 5, wherein said user initiates said call by a wired means, said wired means selected from the group consisting of: land-line telephones, Digital Subscriber Line, and cable.

8. The system of claim 5, wherein said user accesses said system by means of a wireless connection.

9. A non-transitory computer readable storage medium configured to store instructions that when executed cause a processor to perform:
   receiving a call from a user at a media gateway;
   translating said call in said media gateway;
   sending a voice over internet protocol call through an internet protocol network to an element management system requesting a dialed number identification service for redirecting said information;
   prompting said user by said element management system and receiving from said user an account number;
   accessing a central database by said element management system to retrieve a new dialed number identification service for redirecting said call;
   sending a REFER command indicating said new dialed number identification service to said media gateway by means of said internet protocol network;
   translating the route for said new dialed number identification service in said media gateway; and
   redirecting said call by means of a time division multiplexing network to an appropriate conferencing bridge.

10. The non-transitory computer readable storage medium of claim 9, wherein said appropriate conferencing bridge is selected from a plurality of said conferencing bridges.

11. The non-transitory computer readable storage medium of claim 9, wherein said user is notified of the status of said REFER command.

\* \* \* \* \*